L. E. BOGEN.
SYSTEM OF CONTROL.
APPLICATION FILED APR. 19, 1909.

1,030,050.

Patented June 18, 1912.

2 SHEETS—SHEET 1.

Witnesses
John L. Johnson
Chas. L. Byron

Inventor
Louis E. Bogen
By Chas. E. Lord
Attorney

L. E. BOGEN.
SYSTEM OF CONTROL.
APPLICATION FILED APR. 19, 1909.

1,030,050.

Patented June 18, 1912.

2 SHEETS—SHEET 2.

Witnesses
John L. Johnson
Chas. L. Byron

Inventor
Louis E. Bogen
By Chas. E. Lord
Attorney

UNITED STATES PATENT OFFICE.

LOUIS E. BOGEN, OF MILWAUKEE, WISCONSIN, ASSIGNOR TO ALLIS-CHALMERS COMPANY, A CORPORATION OF NEW JERSEY.

SYSTEM OF CONTROL.

1,030,050.  Specification of Letters Patent.  Patented June 18, 1912.

Application filed April 19, 1909. Serial No. 490,962.

*To all whom it may concern:*

Be it known that I, LOUIS E. BOGEN, a citizen of the United States, residing at Milwaukee, in the county of Milwaukee and State of Wisconsin, have invented certain new and useful Improvements in Systems of Control, of which the following is a full, clear, and exact specification.

My invention relates to protective arrangements for dynamo-electric machines, and particularly to arrangements for protecting such machines from operating at too high speeds.

If a vibratory body, such as a tuning fork or vibratory reed, having the proper frequency is suitably placed upon a machine in operation, the vibration of the machine will set such vibratory body into sympathetic vibration.

It is an object of my invention to cause such sympathetic vibation to bring about the operation of one or more protective devices to protect the machine against operation at too high speeds. And it is a further object of my invention to provide an arrangement in which a second protective device comes into operation at a predetermined speed in case a protective device designed to operate at a lower predetermined speed fails of its purpose.

In carrying out one feature of my invention there is provided a vibratory body having such frequency that it is set into sympathetic vibration by the vibrations of the machine to be protected when such machine reaches a predetermined speed, and a protective device which is rendered operative by such vibration of the fork or reed.

In carrying out another feature of my invention there is provided a series of protective devices for a dynamo-electric machine, one of which protective devices is arranged to operate to protect the machine against exceeding a certain speed in case another protective device designed to operate at a lower speed should fail of its purpose. These several protective devices are preferably arranged to be electrically controlled by the sympathetic vibrations of a number of vibratory bodies of predetermined frequencies of vibration.

The various novel features of my invention will appear from the specification and drawings, and will be particularly pointed out in the claims.

Figure 1:
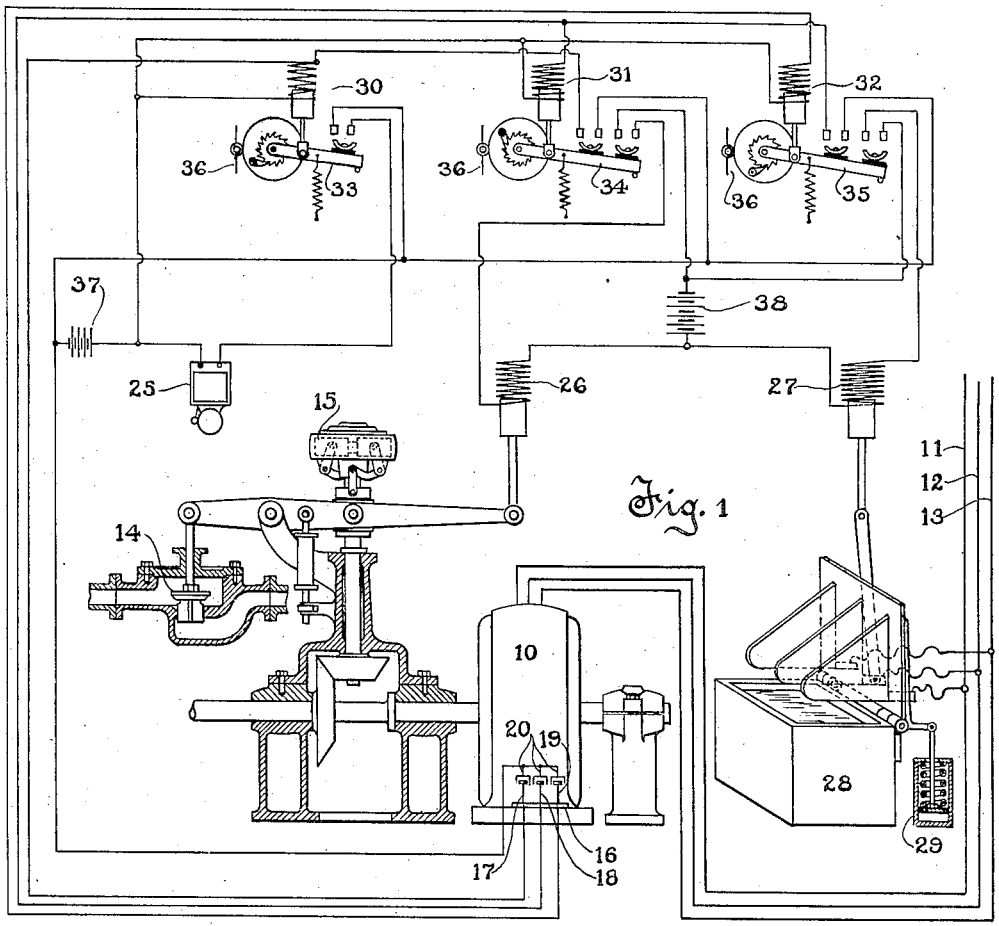
Figure 2:
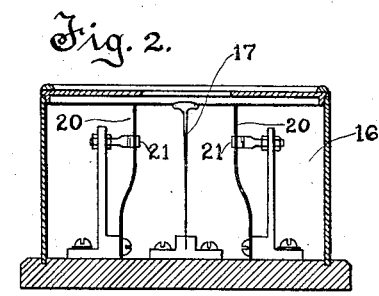
Figure 3:
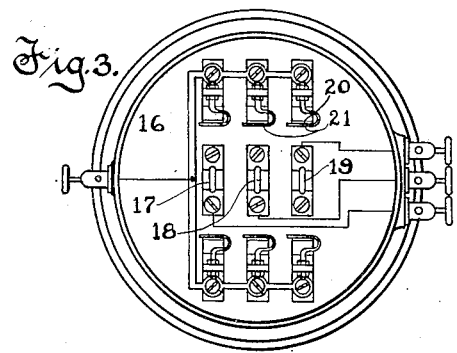
Figure 4:
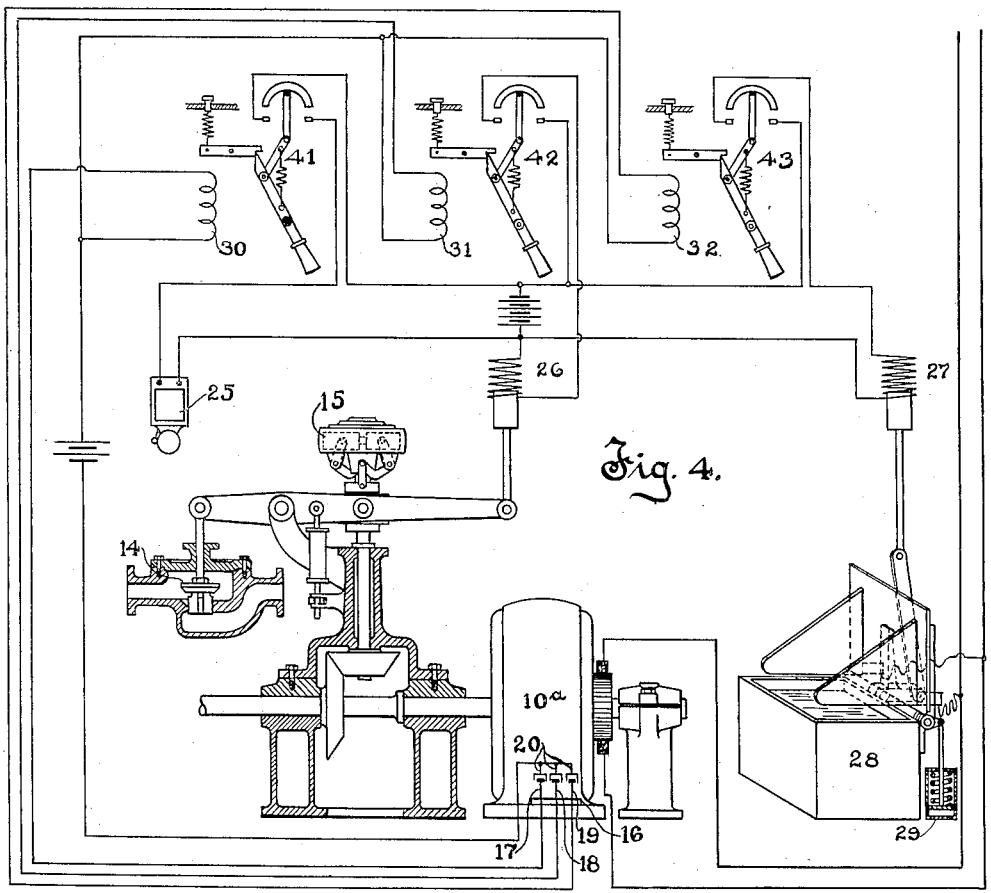

Figure 1 shows diagrammatically one arrangement embodying my invention; Fig. 2 is a sectional elevation of one arrangement of the vibratory controller; Fig. 3 is a plan view of such a controller with the cover removed; and Fig. 4 shows diagrammatically a modified arrangement.

The dynamo-electric machine to be protected may be either a generator or a motor. It is shown in Fig. 1 as a three phase generator 10 supplying a circuit 11—12—13, and is arranged to be driven by any suitable prime mover, the throttle valve of which is indicated at 14. This throttle valve may be controlled by a centrifugal governor 15, driven in any desired fashion from the shaft of the prime mover or the generator 10.

Mounted on or in suitable proximity to the generator 10 or the prime mover driving it is my vibratory controller 16. This controller is best shown in Figs. 2 and 3. It consists of one or more vibratory bodies 17, 18, and 19, which will start into sympathetic vibration when the vibrations of the machine 10 due to its rotation have a corresponding frequency, and will strike a spring or springs 20 to complete an electric circuit. Various kinds of vibratory bodies, such as tuning forks, stretched strings, or metal plates, may be used, but it now seems preferable to use metal reeds as the vibratory bodies, and in the arrangement illustrated reeds are used. The reeds 17, 18, and 19 have different frequencies, which may be anything desired. If other frequencies are desired, suitable reeds may be readily substituted. There may be any desired number of reeds in the controller. The springs 20 are limited in their movement toward the reeds by fingers 21, which prevent the springs from being started into vibration also. When one of the reeds, as 17, is set into vibration and strikes its coöperating spring 20 to complete an electric circuit, it causes the operation of some suitable indicating or protective device for the generator 10.

In the arrangement shown, there are three vibratory reeds 17, 18, and 19, these three reeds respectively controlling three indicating or protective devices. For example, there may be a gong 25, a solenoid 26 controlling the throttle 14, and a solenoid 27 controlling a water rheostat 28 or other variable resistance. This water rheostat is preferably of the type described in my co-pending application Serial No. 490,961 filed April 19, 1909, and is arranged to be connected across the circuit 11—12—13 and to be decreased in resistance value to put a gradually increasing load on the generator 10 when the speed of the latter exceeds a predetermined value. This serves to prevent the speed of such generator from greatly exceeding such value. The rheostat 28 may be retarded in its action by a dash pot 29.

The gong 25 and the solenoids 26 and 27 may be controlled directly by the vibratory reeds 17, 18, and 19. However, they are preferably indirectly controlled by such reeds, the reeds acting respectively to close the circuits of operating solenoids 30, 31, and 32 of sensitive relays 33, 34, and 35, which relays in turn control respectively the gong 25 and the solenoids 26 and 27. Each of the relays 33, 34, and 35 is provided with a retarding device, such as a fan 36, which permits free closing movement of such relay but retards the opening movement thereof. Thus these relays are closed as soon as the reeds respectively controlling them first strike their coöperating springs 20, while they are prevented from opening during the intermissions between successive taps of the reeds on the springs. The relays 34 and 35 control the switch-operating solenoids 30 and 31 respectively, so that the relay 33 will be closed whenever the relay 34 is, and the relay 34 whenever the relay 35 is closed. The various solenoids and the gong 25 may be energized from any desired source or sources. It is usually found desirable to supply the gong 25 and the solenoids 30, 31, and 32 from a battery 37, and the solenoids 26 and 27 from a stronger battery 38.

In operation, the reeds 17, 18, and 19 are arranged to be set into sympathetic vibration when the speed of the generator exceeds values higher by predetermined amounts than the normal. For instance, these reeds may be set into vibration respectively at speeds which are 5, 10, and 15 per-cent higher than the normal speed. In that case, an increase in the speed of the generator to 5% above the normal will cause the reed 17 to strike its springs 20, thus completing the circuit of the solenoid 30 and causing the latter to close the relay 33 and start the gong 25. If the speed of the generator 10 continues to rise, perhaps because the operator disregards the ringing of the gong 25, and reaches 10% over-speed, the reed 18 starts to vibrate, and through the solenoid 31 and relay 34 causes the solenoid 26 to act on the governor 15 and throttle 14 to diminish or entirely shut off the supply fluid to the prime mover. The gong 25 will continue to ring at this time, although the reed 17 may have stopped vibrating, for the circuit of the solenoid 30 is closed at the relay 34. The shutting off of the fluid supply to the prime mover will generally prevent any further rise in speed of the generator 10. But sometimes it does not. Perhaps this is because of an incomplete or insufficient shutting off of the fluid supply. If the speed of the generator still continues to rise and reaches 15% over-speed, the reed 19 is set into vibration, and through the solenoid 32 and relay 35 causes the solenoid 27 to operate the rheostat 28. This puts a gradually increasing electrical load on the machine 10. This increase in load is universally effective to prevent further rise in speed of the generator. During this time the gong 25 and solenoid 26 remain operative, for the circuit of the solenoid 31 is maintained complete by the relay 35 although the reed 18 may no longer strike its springs 20. As the speed of the machine 10 diminishes from the excessive speed to which it may have attained, the indicating and protective devices are deënergized in just the reverse order to that in which they are energized. If desired, however, the solenoids 30, 31, and 32 may be arranged as tripping coils for switches 41, 42, and 43 which are biased to closed position, the attention of the operator being necessary in such cases to reset such switches and deënergize the gong 25 and solenoids 26 and 27. This arrangement is shown in Fig. 4, which also shows a direct current generator 10ª as the machine to be protected, the other parts being substantially as shown in Fig. 1. In the arrangement of Fig. 4, however, the solenoids 30 and 31 are controlled only by the vibratory reeds, it being unnecessary for them to be also controlled by the switches tripped by the solenoids 31 and 30 respectively.

Many modifications may be made in the precise arrangements illustrated and described. All such which do not involve a departure from the spirit and scope of my invention I aim to cover in the following claims.

What I claim as new is:

1. In combination, a machine to be protected, a vibratory body arranged to be set into sympathetic vibration by the vibrations of the machine when the speed of the latter reaches a predetermined value, and an electrically controlled indicating or protective device for said machine the circuit of which is controlled by said vibratory body.

2. In combination, a machine, a vibratory body arranged to be set into sympathetic vibration by the vibrations of the machine when the speed of the latter is at a predetermined value, and an electric circuit controlled by said vibratory body.

3. In combination, a machine to be protected, a plurality of vibratory bodies having different frequencies of vibration and mounted on such machine to be set into sympathetic vibration when the machine rotates at speeds corresponding to such frequencies, and a plurality of protective devices for such machines which are controlled by the vibrations of the respective vibratory bodies.

4. In combination, a machine to be protected, a plurality of vibratory bodies having different frequencies of vibration and mounted on such machine to be set into sympathetic vibration when the machine rotates at speeds corresponding to such frequencies, a signal controlled by one of said vibratory bodies, and a protective device for the machine controlled by another of such vibratory bodies with a higher frequency of vibration.

5. In combination, a dynamo-electric machine, a vibratory body mounted on such machine so as to be set into sympathetic vibration when such machine rotates at a predetermined speed, an electrically operated speed-limiting device for such machine, and means for controlling such speed-limiting device by the vibration of said vibratory body.

6. In combination, a machine, a vibratory body arranged to be set into sympathetic vibration by the vibrations of the machine when the speed of the latter is at a predetermined value, and an indicating device which is rendered operative when the vibratory body is set into vibration.

7. In combination, a machine, a vibratory body arranged to be set into sympathetic vibration by the vibration of the machine when the speed of the latter reaches a predetermined value, and a speed limiting device which is rendered operative by the vibrations of said vibratory body.

Milwaukee, Wis., April 15, 1909.

In testimony whereof I affix my signature, in the presence of two witnesses.

LOUIS E. BOGEN.

Witnesses:
H. C. CASE,
CHAS. L. BYRON.